(12) United States Patent
Menon et al.

(10) Patent No.: US 12,501,084 B2
(45) Date of Patent: Dec. 16, 2025

(54) EFFICIENT TWO-PASS ENCODING SCHEME FOR ADAPTIVE LIVE STREAMING

(71) Applicant: Bitmovin GmbH, Klagenfurt am Wörthersee (AT)

(72) Inventors: Vignesh V. Menon, Klagenfurt am Wörthersee (AT); Hadi Amirpour, Klagenfurt am Wörthersee (AT); Christian Timmerer, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 10 days.

(21) Appl. No.: 18/371,852

(22) Filed: Sep. 22, 2023

(65) Prior Publication Data

US 2024/0114183 A1 Apr. 4, 2024

Related U.S. Application Data (60) Provisional application No. 63/409,922, filed on Sep. 26, 2022.

(51) Int. Cl.
*H04N 21/2343* (2011.01)
*H04N 21/234* (2011.01)
*H04N 21/2187* (2011.01)

(52) U.S. Cl.
CPC ... *H04N 21/2343* (2013.01); *H04N 21/23418* (2013.01); *H04N 21/2187* (2013.01)

(58) Field of Classification Search
CPC ......... H04N 21/2343; H04N 21/23418; H04N 21/2187

USPC ......................................................... 375/240
See application file for complete search history.

(56) References Cited

U.S. PATENT DOCUMENTS

| | | |
|---|---|---|
| 10,104,413 B2 | 10/2018 | Phillips et al. |
| 10,419,773 B1 | 9/2019 | Wei et al. |
| 10,499,081 B1 | 12/2019 | Wang et al. |
| 10,798,399 B1 | 10/2020 | Wei et al. |
| 10,958,947 B1 | 3/2021 | Wei et al. |
| 11,445,168 B1 | 9/2022 | Wei et al. |

(Continued)

OTHER PUBLICATIONS

Bentaleb et al., "A Survey on Bitrate Adaptation Schemes for Streaming Media Over HTTP,", IEEE Communications Surveys & Tutorials, vol. 21, No. 1, 2019, pp. 562-585.

(Continued)

*Primary Examiner* — Susan E. Hodges
(74) *Attorney, Agent, or Firm* — Marton Ribera Schumann & Chang LLP; Chien-Ju Alice Chuang (57) ABSTRACT

Techniques for efficient two-pass encoding for live streaming are described herein. A method for efficient two-pass encoding may include extracting low-complexity features of a video segment, predicting an optimized constant rate factor (CRF) for the video segment using the low-complexity features, and encoding the video segment with the optimized CRF at a target bitrate. A system for efficient two-pass encoding may include a feature extraction module configured to extract low-complexity features from a video segment, a neural network configured to predict an optimized CRF as a function of the low-complexity features and a target bitrate, and an encoder configured to encode the video segment using the optimized CRF at the target bitrate.

15 Claims, 4 Drawing Sheets

(56) References Cited

U.S. PATENT DOCUMENTS

| | | | |
|---|---|---|---|
| 2005/0018881 A1* | 1/2005 | Peker | G11B 27/28 |
| 2010/0189183 A1 | 7/2010 | Gu et al. | |
| 2011/0305273 A1 | 12/2011 | He et al. | |
| 2012/0147958 A1 | 6/2012 | Ronca | |
| 2013/0089142 A1 | 4/2013 | Begen et al. | |
| 2013/0282917 A1 | 10/2013 | Reznik et al. | |
| 2016/0073106 A1 | 3/2016 | Su | |
| 2016/0134881 A1 | 5/2016 | Wang | |
| 2017/0078574 A1 | 3/2017 | Puntambekar et al. | |
| 2017/0078686 A1 | 3/2017 | Coward et al. | |
| 2018/0014050 A1 | 1/2018 | Phillips et al. | |
| 2018/0338146 A1 | 11/2018 | John | |
| 2019/0028745 A1 | 1/2019 | Katsavounidis | |
| 2019/0075301 A1 | 3/2019 | Chou et al. | |
| 2019/0132591 A1* | 5/2019 | Zhang | H04N 19/59 |
| 2019/0289296 A1* | 9/2019 | Kottke | H04N 19/179 |
| 2020/0412784 A1 | 12/2020 | Yamagishi et al. | |
| 2023/0012862 A1* | 1/2023 | Kossentini | H04N 19/119 |

OTHER PUBLICATIONS

Jain et al., "Throughput Fairness Index: An Explaination", 1984, pp. 13.
Mehrabi et al., "Edge Computing Assisted Adaptive Mobile Video Streaming", IEE Transactions on Mobile Computing, vol. 18, No. 4, Apr. 2019, pp. 787-800.
Lederer et al., "Dynamic Adaptive Streaming over HTTP Dataset", Proceedings of the 3rd Multimedia Systems Conference, Feb. 2012, pp. 89-94.
Ericsson, "Ericsson Mobility Report", Nov. 2019, pp. 1-36.
ETSI, "Mobile Edge Computing a Key Technology Towards 5G", ETSI White Paper No. 11, Sep. 2015, pp. 1-16.
Nguyen et al., "Adaptation Method for Video Streaming over HTTP/2", IEICE Communications Express Comex, vol. 1, pp. 1-6, https://www.researchgate.netpublication/292213198_Adaptation_Method_for_Video_Streaming_over_HTTP2).
3GPP "3GPP TS 26.247. Progressive Download and Dynamic Adaptive Streaming over HTTP (3GP-DASH)", 2015, pp. 1, https://portal.3gpp.org/desktopmodules/Specifications/SpecificationDetails.aspx?specificationId=1444.
Gernot Zwantschko, "What is Per-Title Encoding? How to Efficiently Compress Video", Bitmovin, pp. 1-14, https://bitmovin.com/per-title-encoding/.
V.V Menon et al., "Efficient Content-Adaptive Feature-Based Shot Detection for HTTP Adaptive Streaming" IEEE, May 20, 2021, pp. 1-2, https://www.youtube.com/watch?v=jkA1R0shpTc.
Liu et al., "Video Super-Resolution Based on Deep Learning: A Comprehensive Survey", arXiv:2007.12928v3 [cs.CV], Mar. 16, 2022, pp. 1-33.
Jon Dahl, "Instant Per-Title Encoding", Mux, Apr. 17, 2018, pp. 1-8, https://mux.com/blog/instant-per-title-encoding/.
Ledig et al., "Photo-Realistic Single Image Super-Resolution Using a Generative Adversarial Network", arXiv:1609.04802, May 25, 2017, pp. 1-19, http://arxiv.org/abs/1609.04802.
Mishra et al., "A Survey on Deep Neural Network Compression: Challenges, Overview, and Solutions", arXiv:2010.03954, Oct. 5, 2020, pp. 1-19, https://arxiv.org/abs/2010.03954.
Li et al., "Toward a Practical Perceptual Video Quality Metric", Netflix Technology Blog, Jun. 5, 2016, pp. 1-23, https://netflixtechblog.com/toward-a-practical-perceptual-video-quality-metric-653f208b9652.
Menon et al., "ETPS: Efficient Two-pass Encoding Scheme for Adaptive Live Streaming," Athena, https://www.youtube.com/watch?v=-pb3VJtrBN4, Oct. 16-19, 2022, pp. 1-2.
Wiegand et al., "Overview of the H.264/AVC Video Coding Standard," IEEE Transactions on Circuits and Systems for Video Technology, vol. 13, No. 7, Jul. 2003, pp. 560-576.
Zupancic et al., "Two-Pass Rate Control for Improved Quality of Experience in UHDTV Delivery," IEEE Journal of Selected Topics in Signal Processing, 2016, pp. 1-13.
Wang et al., "SSIM-Motivated Two-Pass VBR Coding for HEVC," IEEE Transactions on Circuits and Systems for Video Technology, vol. 27, No. 10, Oct. 2017, pp. 2189-2203.

* cited by examiner

EFFICIENT TWO-PASS ENCODING SCHEME FOR ADAPTIVE LIVE STREAMING

CROSS-REFERENCE TO RELATED APPLICATIONS

This application claims priority to U.S. Provisional Patent Application No. 63/409,922 entitled "Efficient Two-Pass Encoding Scheme for Adaptive Live Streaming," filed Sep. 26, 2022, the contents of which are hereby incorporated by reference in their entirety.

BACKGROUND OF INVENTION

Two-pass encoding, also known as multi-pass encoding, is a video encoding approach used to retain the best compression efficiency during encoding. The input video content is typically analyzed in a first pass to help the second pass encoding to utilize better encoding decisions and improve overall compression efficiency. However, due to the latency added by the first-pass, multi-pass encoding schemes are currently used to encode video content at better compression efficiency only in Video on Demand (VoD) applications. In live streaming applications, a single-pass encoding scheme is mostly used to avoid the additional first-pass encoding run-time to analyze the complexity of the video content.

A conventional one-pass technique might use a constant "rate factor" and a variable quantizer in a Constant Rate Factor (CRF) rate-control mode. The CRF mode is similar to a two-pass mode, except that the target bitrate cannot be specified in advance. Two-pass encoding also works with a "rate factor" pass. CRF mode uses bitrate much more efficiently than Constant Quantization Parameter (CQP) mode, which "blindly" encodes every frame with the same quantizer.

A typical one-pass CBR encoding uses the exact same amount of data to encode a shot (i.e., segment or frame) that is absolutely black (e.g., scene change) as it uses for complex action scenes. A multi-pass encoder using variable bitrate (VBR) can encode the less complex shots with lower bitrates and the more complex scenes at a higher bitrate, thus creating better quality for the scenes that require more bitrate.

Figure 1:
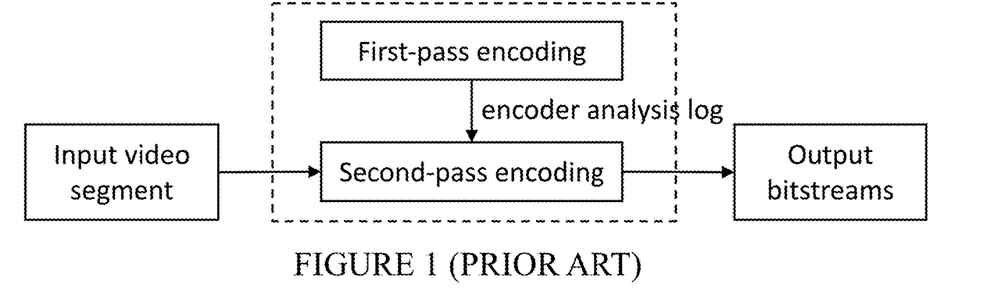
FIG. 1 is a simplified block diagram of an exemplary prior art two-pass encoding architecture.

FIG. 1 shows a conventional two-pass encoding technique. In the first pass of conventional two-pass encoding, the input data from the video is analyzed and stored in a log file. In the second pass, the collected data from the first pass is used to achieve increased encoding compression efficiency. In video encoding, two-pass encoding is usually controlled by the average bitrate setting or by the bitrate range setting (i.e., minimum and maximum allowed bitrate) or by the target video file size setting.

In a conventional two-pass encoding, the encoder processes all of the samples for the stream twice. In the Constant Bitrate (CBR) encoding mode, files that are encoded in two passes are generally more efficient than files encoded in a single pass. However, due to the latency introduced by encoding the same content twice, two-pass encoding is not used in live streams.

Previously known techniques for two-pass encoding include a variable bitrate (VBR) algorithm for Advanced Video Coding (AVC), wherein CBR coding is employed in the first pass to gather the encoding statistics of the input sequences, and then on the basis of the obtained statistics information (i.e., complexity, PSNR, macroblock distributions of each coding type), an offline processing is applied on this data to detect scene cuts, allocate target bits, and determine each frame's quantization parameter based on a rate-distortion model. Then the second pass coding is performed. In another known technique, a fast encoder with a reduced set of coding tools is used as the first-pass, which is used to obtain the data used for rate allocation and model parameter initialization for the second pass. Yet another known technique includes a structural similarity (SSIM) motivated two-pass variable bitrate control algorithm for High Efficiency Video Coding (HEVC). Given a bitrate budget, the available bits are optimally allocated at group of pictures (GOP), frame, and coding unit (CU) levels by hierarchically constructing a perceptually uniform space. Still another known technique establishes a frame complexity model using the rate-distortion (RD) characteristics of each frame, which is later used along with statistics collected in the first-pass to derive an optimal quantization parameter for encoding the frame in the second-pass. Still others use the original frame as the reference for motion estimation, wherein the relationship between the amount of bits generated for each frame and each possible quantization factor is obtained, or a fixed Lagrange multiplier is derived from the information recorded in the downsampled first pass encode and applied for all frames in the second coding pass. Also known is the use of a two-pass rate control algorithm for HEVC to reduce fluctuation of video quality by minimizing distortion variance among GOPs. However, none of these techniques are used for live streaming due to the added latency.

Therefore, an efficient two-pass encoding scheme for adaptive live streaming is desirable.

BRIEF SUMMARY

The present disclosure provides techniques for an efficient two-pass encoding scheme for adaptive live streaming. A method for efficient two-pass encoding may include: extracting low-complexity features of a video segment; predicting, by a neural network, an optimized constant rate factor (CRF) for the video segment using the low-complexity features; and encoding the video segment with the optimized CRF at a target bitrate. In some examples, the extracting low-complexity features of the video segment comprises computing for each of a plurality of resolutions and framerates one or both of a spatial complexity metric and a temporal complexity metric. In some examples, the low-complexity features comprise at least a Discrete Cosine Transform (DCT)-energy-based spatial feature and a DCT-energy-based temporal feature. In some examples, the extracting the low-complexity features of the video segment comprises a first-pass capped variable bitrate encoding.

In some examples, the method also includes receiving, by the neural network, a bitrate set, a resolution set, and a framerate set, wherein predicting the optimized CRF is further based on a target bitrate from the bitrate set, a resolution from the resolution set, and a framerate from the framerate set. In some examples, the neural network comprises a shallow network having as few as two hidden layers.

A system for efficient two-pass encoding may include: a processor; and a memory comprising program instructions executable by the processor to cause the processor to implement: a feature extraction module configured to extract a low-complexity feature from a video segment; a neural network configured to predict an optimized constant rate factor (CRF) as a function of the low-complexity feature of the video segment and a target bitrate; and an encoder configured to encode the video segment using the optimized CRF at a target bitrate. In some examples, the low-complexity feature comprises at least a Discrete Cosine Transform (DCT)-energy-based spatial feature and a DCT-energy-based temporal feature. In some examples, the low-complexity feature comprises one or both of a spatial complexity metric and a temporal complexity metric. In some examples, the neural network is trained to predict the optimized CRF as a function of the target bitrate for each of a set of resolutions and each of a set of framerates. In some examples, the neural network is trained to determine a minimum CRF and a maximum CRF for a target codec and a target bitrate. In some examples, the neural network comprises an input layer, two or more hidden layers, and an output layer.

A distributed computing system may include: a distributed database configured to store a plurality of video segments, a neural network, a plurality of bitrate ladders, and a codec; and one or more processors configured to: extract low-complexity features of a video segment; predict, by the neural network, an optimized constant rate factor (CRF) for the video segment using the low-complexity features; and encode the video segment with the optimized CRF at a target bitrate.

BRIEF DESCRIPTION OF THE DRAWINGS

Various non-limiting and non-exhaustive aspects and features of the present disclosure are described hereinbelow with references to the drawings, wherein.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

Figure 3:
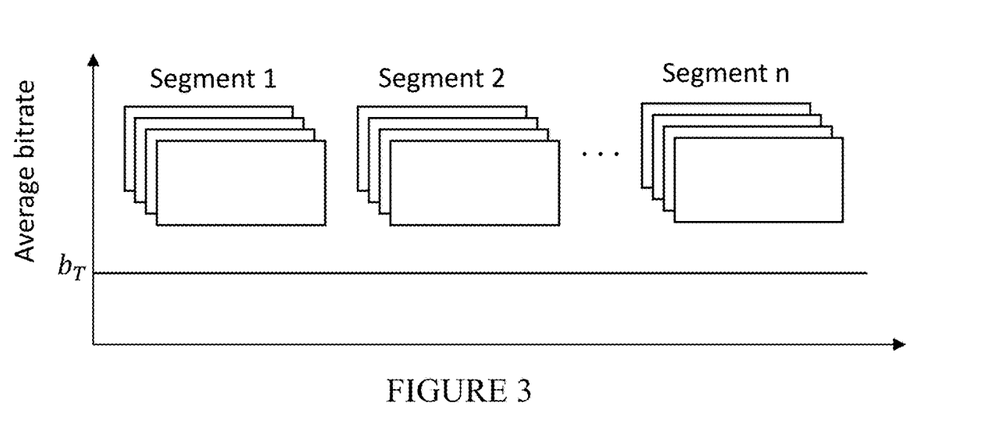
FIG. 3 is a chart showing an optimized target average bitrate being maintained by an efficient two-pass encoding scheme across a plurality of video segments, in accordance with one or more embodiments.

The invention is directed to an efficient two-pass encoding scheme for adaptive live streaming. The proposed efficient low-latency two-pass encoding scheme renders the time for the first-pass analysis negligible, and hence, enables two-pass encoding in live streaming applications. The described efficient two-pass encoding scheme is able to achieve a desired target bitrate while streaming. In some examples, the efficient two-pass encoding scheme may comprise a content-adaptive, bitrate aware, online Constate Rate Factor (CRF) prediction system configured to select CRFs for each segment (e.g., segments $1\text{-}n$) such that a target bitrate ($b_T$) may be achieved, as shown in FIG. 3. FIG. 3 is a chart showing an optimized target average bitrate being maintained by an efficient two-pass encoding scheme across a plurality of video segments $1\text{-}n$, in accordance with one or more embodiments. The encoding scheme described herein is able to achieve uniform bitrate encoding with a high compression efficiency.

In an efficient two-pass encoding scheme, Discrete Cosine Transform (DCT)-energy-based low-complexity spatial and temporal features for each video segment are extracted in a first-pass capped Variable Bitrate (cVBR) encoding. The efficient two-pass encoding scheme described herein yields encoding time savings of approximately 40% or more compared to previous two-pass average bitrate encoding and achieves this efficiency without any noticeable drop in compression efficiency and additional latency in streaming.

The method for efficient two-pass encoding described herein includes (i) content-aware features (e.g., DCT-energy-based low-complexity spatial and temporal features) are extracted to determine a video segment's characteristics, and (ii) based on the content-aware features, a CRF prediction algorithm predicts an optimum CRF for each video segment at every target bitrate.

Figure 2:
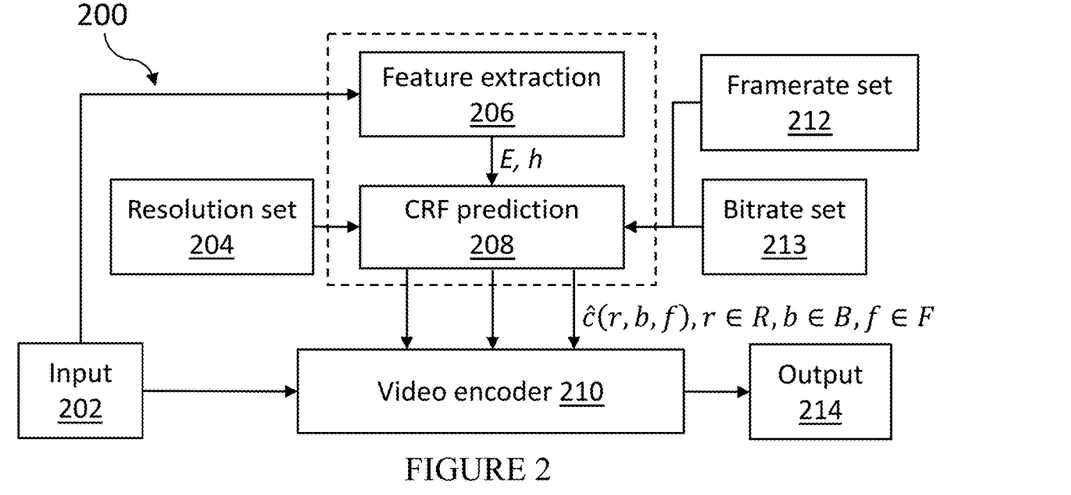
FIG. 2 is a simplified block diagram of an exemplary efficient two-pass encoding system, in accordance with one or more embodiments.

FIG. 2 is a simplified block diagram of an exemplary efficient two-pass encoding system, in accordance with one or more embodiments. System 200 includes a feature extraction module 206, CRF prediction module 208, and encoder 210. System 200 is configured to predict an optimized CRF for each video segment (e.g., of input 202) using spatial and temporal features of the video segment and a set of pre-defined resolutions (R) 204 and bitrates (B) 213 of the bitrate ladder, as well as framerate set (F) 212. In some examples, a video segment may be a number of seconds in length (e.g., 1 second, 2 seconds, 3 seconds, or more). The encoding process may be carried out only for the predicted CRF for each segment, eliminating the need to encode in all CRF values to find an optimized CRF. In an efficient two-pass encoding system, feature extraction module 206 and CRF prediction module 208 perform a pre-processing first-pass, which includes feature extraction (e.g., on a first group of pictures (GOP), a video segment, set of frames, etc.) and optimized CRF prediction. In some examples, video encoder 210 may perform a second-pass using the predicted CRF to run a capped VBR (cVBR) encoding. In some examples, an encoding performed by video encoder 210 may result in output 214.

In live streaming applications, selecting low-complexity features is helpful to enable low-latency video streaming without disruptions. In some examples, for every resolution, optimized CRF for each target bitrate may be determined (e.g., predicted) as a function of the spatial and temporal complexity metrics (E and h, respectively), the target bitrate (b), resolution (r), and framerate (f). For example:

$$c = f(E, h, b, r, f)$$

As shown in FIG. 2, an optimized CRF ($\hat{c}$) may be determined by CRF prediction module 208 using E (e.g., a spatial energy feature) and h (e.g., a temporal energy feature), as extracted by feature extraction module 206, and as a function of target bitrate (e.g., from bitrate set 213), resolution (e.g., from resolution set 204), and framerate (e.g., from framerate set 212):

$$\hat{c}(r, b, f), r \in R, b \in B, f \in F$$

A block-wise texture of each frame may be defined as:

$$H_{p,k} = \sum_{i=0}^{w-1} \sum_{j=0}^{w-1} e^{\left|\left(\frac{ij}{w^2}\right)^2 - 1\right|} |DCT(i, j)|$$

Where k is a block address in the $p^{th}$ frame, w×w pixels is the size of the block, and DCT(i, j) is the (i, j)$^{th}$ DCT component when i+j>0, and 0 otherwise. The texture may be averaged to determine the spatial energy feature denoted as E, which may be defined as:

$$E = \sum_{p=0}^{P-1} \sum_{k=0}^{C-1} \frac{H_{p,k}}{P \cdot C \cdot w^2}$$

Where C represents a number of blocks per frame, and P denotes a number of frames in the segment. Furthermore, the average temporal energy (h) may be defined as:

$$h = \sum_{p=1}^{P-1} \sum_{k=0}^{C-1} \frac{|H_{p,k} - H_{p-1,k}|}{(P-1) \cdot C \cdot w^2}$$

Figure 4:
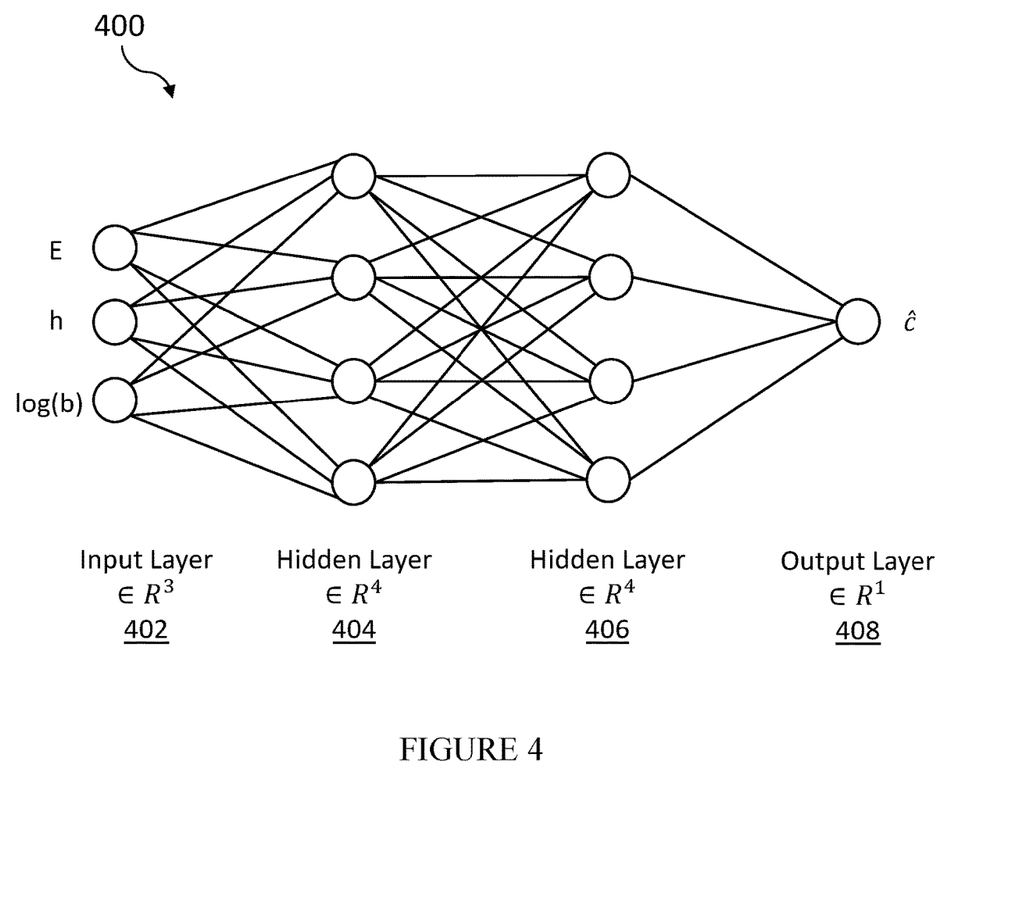
FIG. 4 illustrates a neural network structure for an efficient two-pass encoding scheme, in accordance with one or more embodiments.

In some examples, a shallow neural network may be trained for each resolution r and framerate f, the network configured to determine the optimized CRF based on E, h, and b for each video segment (e.g., of a plurality of video segments). A structure of an exemplary neural network is shown in FIG. 4. FIG. 4 illustrates a neural network structure for an efficient two-pass encoding scheme, in accordance with one or more embodiments. In some examples, network 400 may comprise an input layer 402, two or more hidden layers 404-406, and an output layer 408. Network 400 may be configured to predict optimized CRF for a resolution r and framerate f. A training process of this exemplary network is shown in Algorithm 1, wherein a minimum and maximum CRF ($c_{min}$ and $c_{max}$, respectively) are chosen based on a target codec:

| Algorithm 1: Neural network training |
|---|
| Inputs: |
|     $c_{min}$: minimum supported CRF |
|     $c_{max}$: maximum supported CRF |
| for each training segment do |
|     |    Determine E, h |

| -continued |
|---|
| Algorithm 1: Neural network training |
|     |    for each c ∈ [$c_{min}$, $c_{max}$] do |
|     |    |    Encode segment with CRF c; |
|     |    |    Record the achieved bitrate b; |
| Feed [E, h, log(b)] and c values to the network |

For example, HEVC supports a CRF range between 0 (i.e., $c_{min}$) and 51 (i.e., $c_{max}$)

The target bitrate input may be passed in logarithmic scale to network 400 to reduce internal covariate shift. For example, the input vector passed to the network may be [E, h, log(b)]. In this example, a Rectified Linear Unit (ReLU) may be used as an activation function, and an algorithm for first-order gradient-based optimization of stochastic objective functions (e.g., Adam) may be used as optimizer with a learning rate of $10^{-4}$. An output of network 400 may be an optimized CRF.

In an example, video segments of 30 fps video sequences may be encoded using ×265 v.3.5 with a veryfast preset at Ultra HD (2160p) resolution with a given target bitrate (e.g., 8 Mbps, 12 Mbps, 17 Mbps, 20 Mbps). A segment length may be set as three seconds. A neural network (e.g., Keras) may be used as the machine learning framework. E and h features may be extracted from the video segments using VCA, for example, run in two CPU threads.

Experimental Results

In experiments conducted using methods for efficient two-pass encoding as described herein, significant encoding time savings are shown. An optimized CRF ($c_G$) was determined for each target bitrate for each video segment to be used as the ground truth, the accuracy of a CRF prediction algorithm being determined by the Root Mean Squared Error (RMSE) of $c_G$ and predicted CRF ($\hat{c}$): $\|c_G - \hat{c}\|_2$. The pre-processing time, including time taken to extract E and h features, and to predict CRF ($\tau_p$) is determined to evaluate the first-pass encoding time saving. Furthermore, the resulting overall quality in terms of Peak Signal to Noise Ratio (PSNR) and Video Multimethod Assessment Fusion (VMAF), and the achieved bitrate, are compared for each sequence. Bjøntegaard delta rates $BDR_P$ and $BDR_V$ refer to average increases in bitrate of the representations compared with that of a conventional two-pass average bitrate encoding scheme to maintain the same PSNR and VMAF, respectively. A negative BDR indicates a gain in coding efficiency of the efficient two-pass encoding technique described herein over the conventional two-pass average bitrate encoding method. ΔT represents an overall difference of encoding time of the efficient two-pass encoding technique described herein over the conventional two-pass average bitrate encoding method.

Table 1 below summarizes the average RMSE of $c_G$ and predicted CRF ($\hat{c}$) (i.e., $\|c_G - \hat{c}\|_2$), $\tau_p$, $BDR_P$ and $BDR_V$ results of various test sequences using the efficient two-pass encoding technique described herein. The average RMSE of $c_G$ and predicted CRF (c) was observed as 1.02. The prediction error ranges from 0.5 to 1.93. The average time taken to predict the CRF for each segment was 0.21 seconds. On average, increases in bitrate of the representations (i.e., $BDR_P$ and $BDR_V$) over conventional methods were 0.26% and 0.38%, respectively.

TABLE 1

Results of ETPS against Constant Bitrate (CBR) encoding and two-pass average bitrate encoding schemes.

| Dataset | Video | E | h | $\|c_G - \hat{c}\|$ | $\tau_p$ (in ms) | Constant bitrate (CBR) | | | Two-pass average bitrate | | |
|---|---|---|---|---|---|---|---|---|---|---|---|
| | | | | | | $BDR_P$ | $BDR_V$ | $\Delta T$ | $BDR_P$ | $BDR_V$ | $\Delta T$ |
| MCML | Basketball | 15.75 | 9.69 | 0.86 | 8 | 17.80% | −14.36% | 0.43% | −0.48% | 0.50% | −45.15% |
| MCML | Bunny | 23.03 | 4.89 | 1.58 | 7 | −9.92% | −9.09% | 0.78% | 0.04% | −1.14% | −43.88% |
| MCML | Crowd | 33.11 | 7.03 | 1.58 | 7 | −7.63% | −1.47% | 0.56% | 0.75% | 1.05% | −43.34% |
| MCML | Dolls | 19.91 | 12.22 | 0.86 | 8 | −5.73% | −4.05% | 1.01% | 1.21% | 1.97% | −45.26% |
| MCML | Flowers | 12.01 | 10.47 | 0.50 | 7 | −8.44% | −7.12% | −0.59% | 0.38% | 0.49% | −43.90% |
| MCML | Park | 26.07 | 27.34 | 0.71 | 9 | −5.16% | −2.62% | 1.10% | 0.16% | 0.87% | −44.27% |
| SJTU | BndNtScape | 54.90 | 11.62 | 1.93 | 8 | −14.63% | −13.51% | −1.62% | 1.11% | −1.27% | −40.91% |
| SJTU | CampfirePty | 51.50 | 42.38 | 1.58 | 8 | −4.66% | −3.66% | −1.72% | −0.51% | −0.35% | −43.04% |
| SJTU | Runners | 104.30 | 17.44 | 1.32 | 7 | −8.14% | −2.44% | −1.34% | −0.77% | −1.08% | −42.69% |
| SJTU | TallBldgs | 94.35 | 7.70 | 1.65 | 8 | −17.30% | −12.54% | −1.02% | 0.89% | 0.59% | −43.37% |
| SJTU | TrafficnBldg | 60.54 | 11.55 | 1.87 | 8 | −15.41% | −9.91% | −0.43% | 0.06% | −2.42% | −43.96% |
| SJTU | TrafficFlow | 58.93 | 8.61 | 1.32 | 8 | 15.66% | −1.17% | 0.74% | 1.19% | 1.43% | −43.86% |
| SJTU | TreeShade | 80.19 | 15.83 | 0.50 | 8 | −11.82% | −6.85% | −0.79% | 0.52% | 0.59% | −44.75% |
| SJTU | Wood | 114.26 | 8.83 | 0.71 | 8 | −10.14% | −21.58% | 0.52% | 1.34% | 1.88% | −44.50% |
| | Average | | | 1.02 | 8 | −10.89% | −8.60% | 0.65% | 0.26% | 0.38% | −43.78% |

Thus, the efficient two-pass encoding technique described herein can achieve similar compression efficiency as conventional two-pass average bitrate encoding methods, but with significant encoding time savings, adding no additional noticeable delay in encoding, which makes it suitable for live streaming.

Figure 5A:
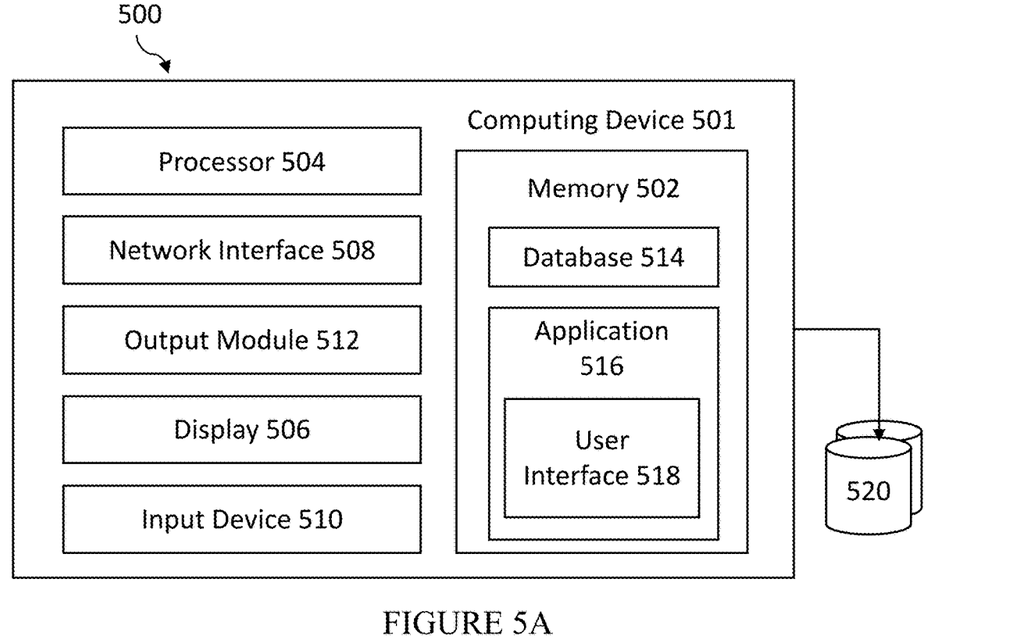
FIG. 5A is a simplified block diagram of an exemplary computing system configured to perform steps of the method illustrated in FIG. 6 and to implement the system illustrated in FIGS. 2 and 4, in accordance with one or more embodiments.
Figure 5B:
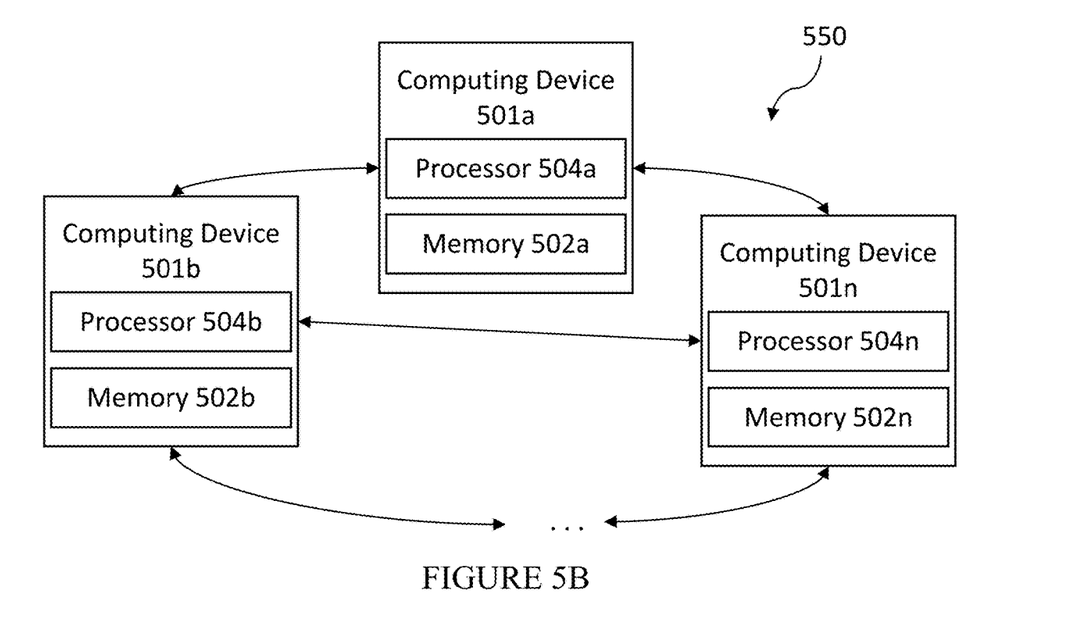
FIG. 5B is a simplified block diagram of an exemplary distributed computing system implemented by a plurality of the computing devices, in accordance with one or more embodiments.
Figure 6:
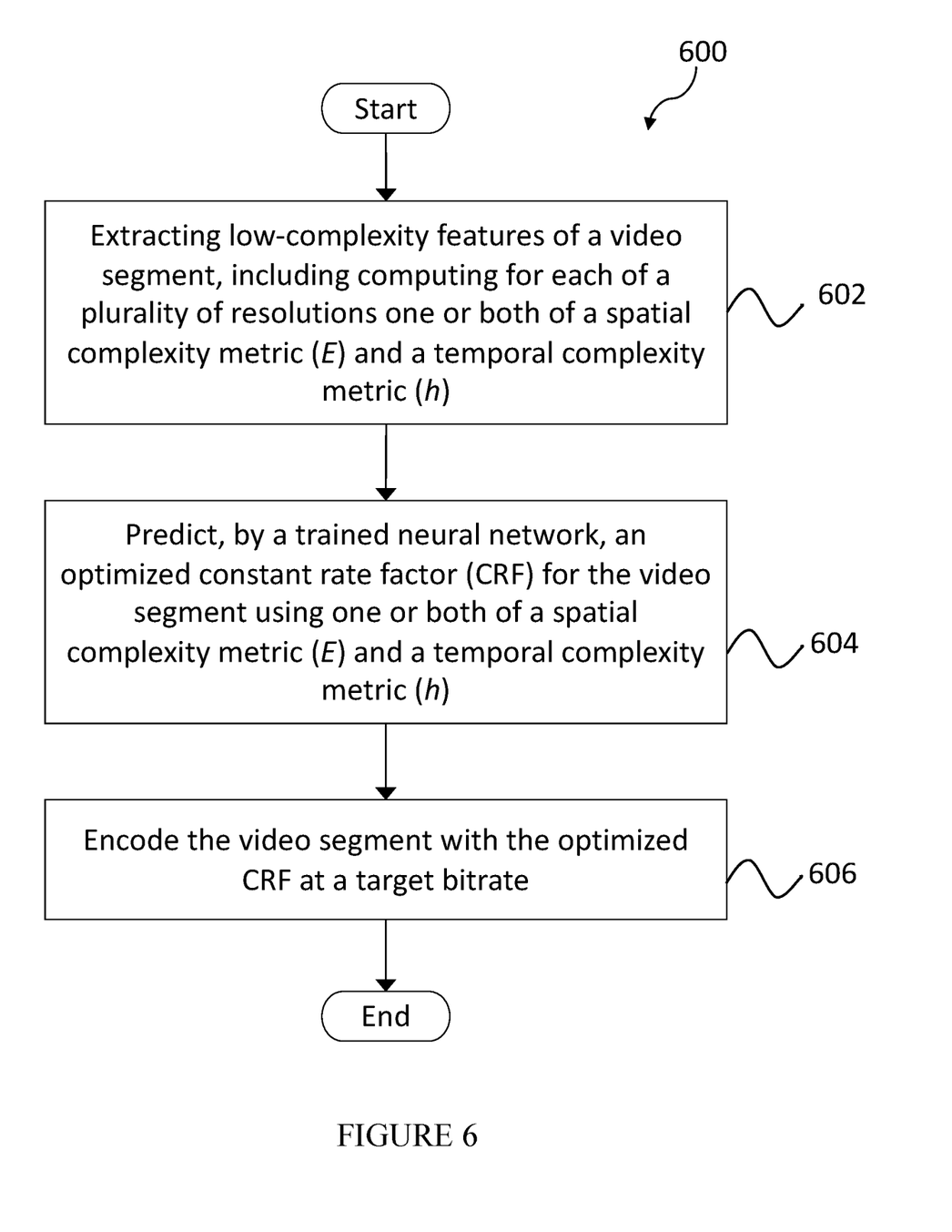
FIG. 6 is a flow diagram illustrating a method for efficient two-pass encoding, in accordance with one or more embodiments.

FIG. 5A is a simplified block diagram of an exemplary computing system configured to perform steps of the method illustrated in FIG. 6 and to implement the system illustrated in FIGS. 2 and 4, in accordance with one or more embodiments. In one embodiment, computing system 500 may include computing device 501 and storage system 520. Storage system 520 may comprise a plurality of repositories and/or other forms of data storage, and it also may be in communication with computing device 501. In another embodiment, storage system 520, which may comprise a plurality of repositories, may be housed in one or more of computing device 501. In some examples, storage system 520 may store video data (e.g., frames, resolutions, and the like), neural networks (e.g., trained), codecs, features, instructions, programs, and other various types of information as described herein. This information may be retrieved or otherwise accessed by one or more computing devices, such as computing device 501, in order to perform some or all of the features described herein. Storage system 520 may comprise any type of computer storage, such as a hard-drive, memory card, ROM, RAM, DVD, CD-ROM, write-capable, and read-only memories. In addition, storage system 520 may include a distributed storage system where data is stored on a plurality of different storage devices, which may be physically located at the same or different geographic locations (e.g., in a distributed computing system such as system 550 in FIG. 5B). Storage system 520 may be networked to computing device 501 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 501 also may include a memory 502. Memory 502 may comprise a storage system configured to store a database 514 and an application 516. Application 516 may include instructions which, when executed by a processor 504, cause computing device 501 to perform various steps and/or functions, as described herein. Application 516 further includes instructions for generating a user interface 518 (e.g., graphical user interface (GUI)). Database 514 may store various algorithms and/or data, including neural networks and data regarding video data and feature maps, among other types of data. Memory 502 may include any non-transitory computer-readable storage medium for storing data and/or software that is executable by processor 504, and/or any other medium which may be used to store information that may be accessed by processor 504 to control the operation of computing device 501.

Computing device 501 may further include a display 506, a network interface 508, an input device 510, and/or an output module 512. Display 506 may be any display device by means of which computing device 501 may output and/or display data. Network interface 508 may be configured to connect to a network using any of the wired and wireless short range communication protocols described above, as well as a cellular data network, a satellite network, free space optical network and/or the Internet. Input device 510 may be a mouse, keyboard, touch screen, voice interface, and/or any or other hand-held controller or device or interface by means of which a user may interact with computing device 501. Output module 512 may be a bus, port, and/or other interface by means of which computing device 501 may connect to and/or output data to other devices and/or peripherals.

In one embodiment, computing device 501 is a data center or other control facility (e.g., configured to run a distributed computing system as described herein), and may communicate with a media playback device. As described herein, system 500, and particularly computing device 501, may be used for implementing efficient two-pass encoding, as described herein. Various configurations of system 500 are envisioned, and various steps and/or functions of the processes described herein may be shared among the various devices of system 500 or may be assigned to specific devices.

FIG. 5B is a simplified block diagram of an exemplary distributed computing system implemented by a plurality of the computing devices, in accordance with one or more embodiments. System 550 may comprise two or more computing devices 501*a-n*. In some examples, each of 501*a-n* may comprise one or more of processors 504*a-n*, respectively, and one or more of memory 502*a-n*, respectively. Processors 504*a-n* may function similarly to processor 504 in FIG. 5A, as described above. Memory 502*a-n* may function similarly to memory 502 in FIG. 5A, as described above.

FIG. 6 is a flow diagram illustrating a method for efficient two-pass encoding, in accordance with one or more embodiments. Method 600 may begin with extracting low-complexity features of a video segment, including computing for each of a plurality of resolutions one or both of a spatial complexity metric and a temporal complexity metric, at step 602. In some examples, the one or both of the spatial and complexity metric and the temporal complexity metric also may be computed for each of a plurality of framerates and/or a plurality of resolutions and framerates. An optimized constant rate factor for the video segment may be predicted using a trained neural network, the optimized constant rate factor being determined based on the one or both of the spatial complexity metric and the temporal complexity metric, at step 604. The video segment may be encoded for the predicted constant rate factor at a target bitrate at step 606.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for efficient two-pass encoding comprising:
   extracting low-complexity features of a video segment;
   predicting, by a neural network, an optimized constant rate factor (CRF) for the video segment using the low-complexity features;
   receiving, by the neural network, a bitrate set, a resolution set, and a framerate set, wherein predicting the optimized CRF is further based on a target bitrate from the bitrate set, a resolution from the resolution set, and a framerate from the framerate set; and
   encoding the video segment with the optimized CRF at a target bitrate.

2. The method of claim 1, wherein the extracting low-complexity features of the video segment comprises computing for each of a plurality of resolutions and framerates one or both of a spatial complexity metric and a temporal complexity metric.

3. The method of claim 1, wherein the low-complexity features comprise at least a Discrete Cosine Transform (DCT)-energy-based spatial feature and a DCT-energy-based temporal feature.

4. The method of claim 1, wherein the extracting the low-complexity features of the video segment comprises a first-pass capped variable bitrate encoding.

5. The method of claim 1, wherein the neural network comprises a shallow network having as few as two hidden layers.

6. The system for efficient two-pass encoding comprising:
   a processor; and
   a memory comprising program instructions executable by the processor to cause the processor to implement:
      a feature extraction module configured to extract a low-complexity feature from a video segment;
      a neural network configured to predict an optimized constant rate factor (CRF) as a function of the low-complexity feature of the video segment and a target bitrate; and
      an encoder configured to encode the video segment using the optimized CRF at the target bitrate,
      wherein the neural network is trained to predict the optimized CRF as a function of the target bitrate for each of a set of resolutions and each of a set of framerates.

7. The system of claim 6, wherein the low-complexity feature comprises at least a Discrete Cosine Transform (DCT)-energy-based spatial feature and a DCT-energy-based temporal feature.

8. The system of claim 6, wherein the low-complexity feature comprises one or both of a spatial complexity metric and a temporal complexity metric.

9. The system of claim 6, wherein the neural network is trained to determine a minimum CRF and a maximum CRF for a target codec and a target bitrate.

10. The system of claim 6, wherein the neural network comprises an input layer, two or more hidden layers, and an output layer.

11. A distributed computing system comprising:
    a distributed database configured to store a plurality of video segments, a neural network, a plurality of bitrate ladders, and a codec; and
    one or more processors configured to:
       extract low-complexity features of a video segment;
       predict, by the neural network, an optimized constant rate factor (CRF) for the video segment using the low-complexity features; and
       encode the video segment with the optimized CRF at a target bitrate, wherein the neural network is trained to predict the optimized CRF as a function of the target bitrate for each of a set of resolutions and each of a set of framerates.

12. The system of claim 11, wherein the low-complexity feature comprises at least a Discrete Cosine Transform (DCT)-energy-based spatial feature and a DCT-energy-based temporal feature.

13. The system of claim 11, wherein the low-complexity feature comprises one or both of a spatial complexity metric and a temporal complexity metric.

14. The system of claim 11, wherein the neural network is trained to determine a minimum CRF and a maximum CRF for a target codec and a target bitrate.

15. The system of claim 11, wherein the neural network comprises an input layer, two or more hidden layers, and an output layer.

* * * * *